J. CASE.
Corn Planter.
No. 3,144. Reissued Oct. 6, 1868.
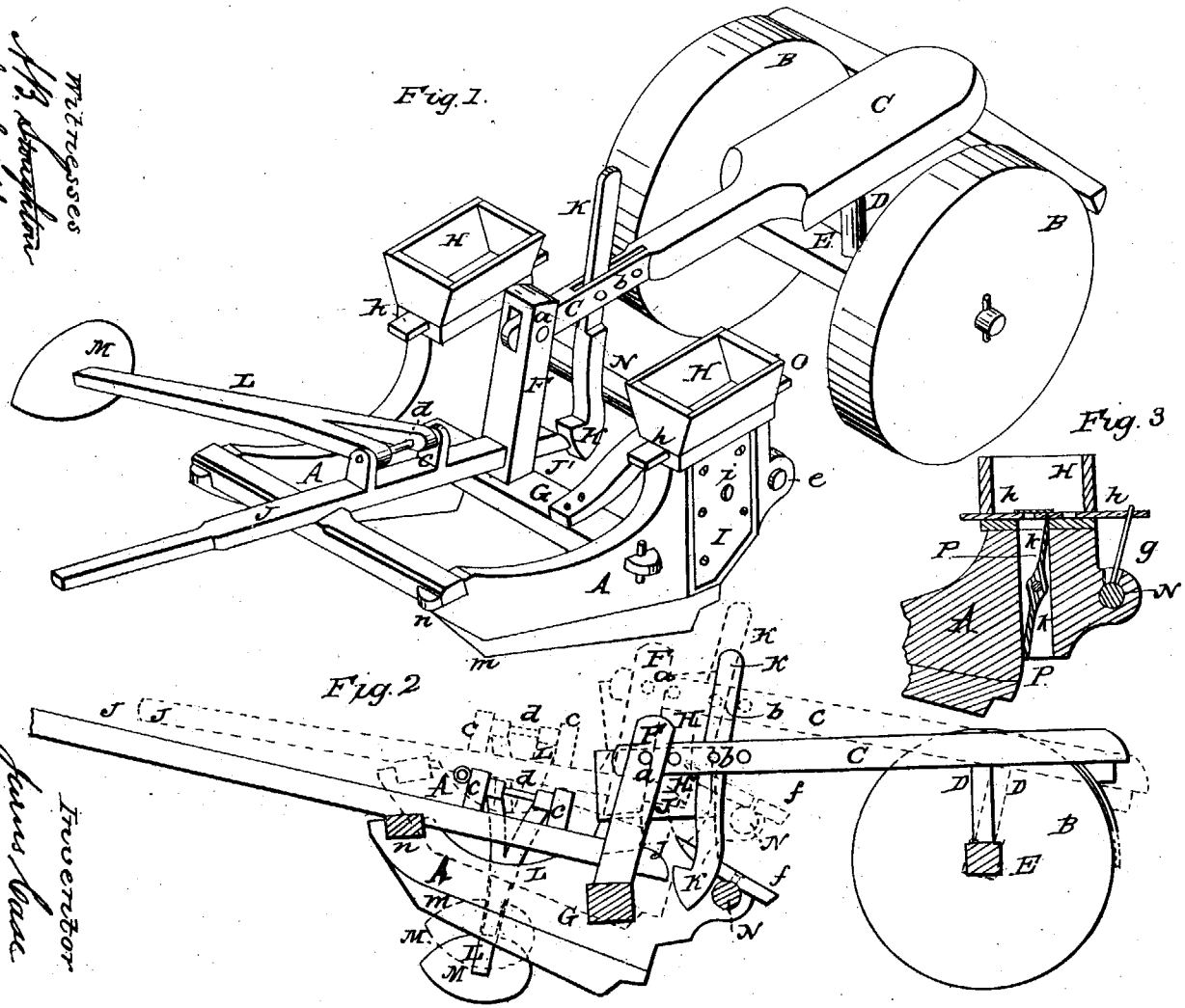
Witnesses
M B. Stoughton
Thos H. Upperman.
Inventor
James Case
N. PETERS, Photo-Lithographer, Washington, D. C.

UNITED STATES PATENT OFFICE.

JARVIS CASE, OF LA FAYETTE, INDIANA, FOR HIMSELF AND NEWTON BALDWIN, ADMINISTRATOR OF WM. BALDWIN, DECEASED, ASSIGNEES OF JARVIS CASE.

IMPROVEMENT IN SEED-PLANTERS.

Specification forming part of Letters Patent No. 22,228, dated December 7, 1858; Reissue No. 3,144, dated October 6, 1868.

*To all whom it may concern:*

Be it known that I, JARVIS CASE, of La Fayette, in the county of Tippecanoe and State of Indiana, have invented a new and useful Improvement in Machines for Planting Seed or Dropping Corn; and I do hereby declare the following to be a full, clear, and exact description of the construction and operation of the same, reference being had to the accompanying drawings, making a part of this specification, in which—

Figure 1 represents a perspective view of the machine. Fig. 2 represents a longitudinal vertical section through the machine, the lines in black showing the position of the parts when the machine is dropping corn, and those in red showing their position when the front truck is raised up to turn the machine around at the ends of the furrows or to transport it from place to place. Fig. 3 represents a vertical section through the rear of one of the runners, to show the operation of the valves.

Similar letters of reference, where they occur in the separate figures, denote like parts of the machine in all of them.

This machine, in many of its characteristics, resembles that patented to me on the 1st day of December, 1857, the improvements which I have made being calculated to render the above-mentioned machine more simple and cheap in its construction, much lighter, and consequently more easily drawn over the field, and relieves the operator of much that he was required to perform in the machine above referred to as heretofore patented by me.

To enable others skilled in the art to make and use my invention, I will proceed to describe the same with reference to the drawings.

My machine is composed of two trucks—a front and rear one. The front truck is supported on two runners, A A, of peculiar form, and the rear truck on two wheels, B B. These two trucks are connected together by the driver's seat C, the driver being also the operator of the machine. The seat C is rigidly secured to the rear truck by a standard, D, supported on the axle E of said truck, and, extending forward, is connected by a hinged joint at *a* to the front truck by means of the standard F, rigidly connected to the cross-piece G of said forward truck. This simple way of connecting the front and rear trucks by a single piece, and that piece the driver's seat, or a prolongation of his seat, dispenses with the side rails and their jointed connections, and thus much simplifies and cheapens its construction, and makes it also much lighter. It also yields laterally more easily on uneven ground.

The seed boxes or hoppers H H are mounted on the rear of the runners A A of the front truck, as in my former patented machine; but instead of making the seed-ducts, as in that machine, entirely within the runners, I now cut a gain or mortise in the wood of the runners and cover them with metal or other plates, I, one of which is seen in Fig. 1. This effectually prevents the openings through the shoes or runners, through which the grain drops, from getting clogged up with soft earth when the said runners are let down to commence the dropping.

The tongue J is so connected to the front truck as to be rigid, its rear end, J′, extending back far enough to be caught and held by a trigger, K, which is pivoted at *b* to the seat C, when it becomes necessary to raise up the front truck from the ground. This trigger K is in convenient position to be readily caught and operated by the driver when standing with his feet on the ground. To lugs *c c* on the heel of the tongue is pivoted, by a rod, *d*, or otherwise, the arm L, that carries the marker M. The tops of the runners A are hollowed or cut out where this arm L overlies them, so that when the machine is dropping the corn they shall not touch each other; but when the front truck is raised and held up by the trigger K, as shown by the red lines in Fig. 2, then the top of the runner comes against the arm L, raising it up also, and its marker M likewise, clear of the ground, so that the driver, when he raises up the front truck to turn the machine around, is not required, as he was in my other machine above referred to, to also raise up and prop or support the marker, thus saving him entirely from that among his other duties. The arranging of the marker, too, upon the front instead of the rear truck, as in my other machine, enables the driver to constantly watch and see the marker without turning his face from his horses.

N is a rock-shaft extending across the machine and its journals *e*, supported in bearings in the rear of the runners A. Upon this rock-shaft N there is a foot-piece, *f*, Fig. 2, upon which the driver places one of his feet, and by which he rocks said shaft, and thus works the valves. A permanent support, O, extends from the cross-piece G rearward, upon which the driver places his other foot, and thus firmly braces himself on his seat. To the rock-shaft N are affixed arms *g*, Fig. 3, (one only being shown,) which enter the horizontal seed slides or valves *h h* in the bottom of the hoppers, and thus these slides, which are provided with suitable cells for the purpose, let out the proper charges of grain from the hopper into the seed-ducts P. In these seed-ducts are hung, by a pivot, *i*, Fig. 1, throttle-valves *k*, the upper ends of which are connected to the horizontal valves *h*, so that the valves *k* are operated by those *h*. The valves *k* receive the charges of grain from the hopper first upon one of their sides and then upon the opposite one, retaining one charge while it allows the previous to pass into the furrow. The lower ends of these valves *k* are very close to the ground, and the double dropping by hand, as heretofore patented to me, entirely compensates for the forward motion of the machine, so that every charge of grain is or can be dropped in its exact position.

The runners are shod with iron, and I make the edges of these runners perfectly straight so far as they enter the ground or are liable to strike against stalks, clods, &c.; but from this point—say the point *m*—I taper or curve them to their extremity *n* or make them also straight, but at a different angle from the working-edge. The working-edges of the runners stand at an inclination of about fifteen or twenty degrees with the ground, or, as shown in Fig. 2, their heels *o* only, as it were, touching the plane of the furrow. Such an inclination I find most advantageous in pressing down stalks, &c., into the ground, for they will not keep edge enough to cut them in two, and where the edge is convex or rounded and much of its line rests or runs upon the ground they will drag the cornstalks with them, and thus choke or clog them. When the stalks are very dry they may be severed or broken; but when wet it cannot be done, and I rely upon pressing them down into the ground far enough not to interfere with the furrow. I do not attack an evil I cannot conquer, but contrive to avoid its injurious effects, which I effectually do by so inclining the edge of the runners as to press down into the ground the cornstalks which cannot otherwise be gotten rid of.

Having thus fully described my invention, what I claim is—

1. A corn-planter consisting of a front and rear frame, when said frames are connected by a central bar, said connecting-bar being either an extension of the driver's seat or an independent bar, substantially as described.

2. Pivoting the rear frame to the front one by means of the forward extension of the driver's seat, connected to the post F or its equivalent, substantially as described.

3. The locking bar or catch K, pivoted to the seat-bar C, and arranged to engage under the projection *j* or its equivalent, substantially as set forth.

4. The reversible marker consisting of the rigid bar L, hinged to the front frame in such a manner that its outer end shall rest upon the ground without being raised therefrom or resting on the runner while the machine is in operation, and still be raised clear from the ground when the front part of the machine is elevated, substantially as described.

5. A runner for corn-planters, having the hollow or recess in its upper edge for the marker, a seed-duct formed by cutting a channel in the side of the runner and covering it with a plate, and also having the straight edge of the runner so inclined that its heel shall be the lowest point, substantially as and for the purposes set forth.

6. The combination of the rock-shaft N, with the treadle or foot-lever *f*, applied thereto, with the seed-slide *h*, arranged to operate substantially as described, for the purpose of enabling the driver to operate the seed-slides with his feet, as set forth.

JARVIS CASE.
NEWTON BALDWIN,
*Administrator estate of Wm. Baldwin, deceased.*

Witnesses:
JOHN S. ALLEN,
HENRY F. BLODGETT.